United States Patent [19]

Schneider

[11] 4,139,818

[45] Feb. 13, 1979

[54] CIRCUIT MEANS FOR COLLECTING OPERATIONAL ERRORS IN IC CHIPS AND FOR IDENTIFYING AND STORING THE LOCATIONS THEREOF

[75] Inventor: Robert P. Schneider, Wayne, Pa.

[73] Assignee: Burroughs Corporation, Detroit, Mich.

[21] Appl. No.: 838,137

[22] Filed: Sep. 30, 1977

[51] Int. Cl.² .................................. G01R 15/12
[52] U.S. Cl. ............................. 324/73 R; 324/51;
                                           324/73 AT; 324/73 PC
[58] Field of Search .................. 324/51, 73 AT, 73 R,
                                           324/130, 73 PC

[56] References Cited

U.S. PATENT DOCUMENTS

| | | | |
|---|---|---|---|
| 3,763,430 | 10/1973 | Terrey | 324/73 R |
| 3,777,261 | 12/1973 | Strenglein | 324/73 R |
| 3,831,149 | 8/1974 | Job | 324/73 R |

Primary Examiner—M. Tokar
Attorney, Agent, or Firm—Francis A. Varallo; Edmund M. Chung; Kevin R. Peterson

[57] ABSTRACT

The present disclosure describes electronic circuits for use with test and diagnostic (T&D) means to collect errors orignating within integrated circuit (IC) chips during their operation in a system environment. Moreover, the circuits employ counters and a memory to identify and store the location of the defective chips so that prompt remedial action may be taken.

15 Claims, 3 Drawing Figures

CIRCUIT MEANS FOR COLLECTING OPERATIONAL ERRORS IN IC CHIPS AND FOR IDENTIFYING AND STORING THE LOCATIONS THEREOF

CROSS REFERENCE TO RELATED APPLICATION

To the extent that the collection and storage circuits of the present invention find particular application in conjunction with the test and diagnostic means incorporated in the high density integrated circuits disposed on island assemblies as described and claimed in Application Ser. No. 513,282, now U.S. Pat. No. 3,946,276, for "Island Assembly Employing Coding Means for High Density Integrated Circuit Packaging", by Robert E. Braun et al, such application is referenced herein. This last mentioned application and the present one are assigned to the same assignee.

BACKGROUND OF THE INVENTION

As noted in the reference application, electronic equipment, particularly modern data processing systems, use high density packaging of integrated circuits. In such systems, the need arises for continual checking of the electrical integrity of the circuits while they are operational. In fact, the purpose of the test and diagnostic means mentioned hereinbefore is to generate an error signal before a deteriorating condition within a chip causes an actual logical error to occur. Of course, catastrophic failures are also indicated by the T&D means.

In either event, the defective chips must be identified and replaced. In a high density system, the task of seeking out chip errors is a complex and time consuming task. The present invention alleviates this difficulty by interfacing with the T&D means associated with the IC chips, collecting the error signals which are supplied by such means and then storing the locations of the chips in which the errors originated. An operator is then able to quickly locate, remove and replace the defective chips.

SUMMARY OF THE INVENTION

In performing its function, the circuit means of the present invention interface with all of the IC chips in a given logical subsection. The island configuration described in the reference application represents such a subsection and includes approximately 200 chips. Each of the chips mounted on the island includes a single pin which is reserved for T&D purposes. The voltage levels appearing on the respective T&D pins are representative of the operational integrity of the chips, and these levels serve as input signals to the present circuit. For example, a predetermined polarity level on any T&D pin may represent an error condition in the associated chip.

In operation, the present circuit assumes two sequential modes, namely, a "look" mode in which error signals from the chips are collected, and a "shift" mode in which the locations of the defective chips are identified and stored. Thus, in the "look" mode, the error signals from the plurality of chips in the system are stored in respective stages of one or more shift registers, each stage of which is coupled to a T&D pin of one of the chips. The presence of an error signal in one or more of the shift register stages simultaneously, causes the present circuit to assume the "shift" mode. In the latter mode, and assuming for ease of description, that a single error has occurred, shift pulses are applied to the shift registers to advance the error signal through the plurality of stages thereof. A count is maintained of the number of shift pulses required to cause the error signal to output the last shift register stage. Since each chip T&D pin is coupled to a preselected shift register stage, and the total number of stages is known, the shift count required to serially advance an error signal from any given stage through the last register stage is directly related to the chip location at which the error occurred. The shift count associated with the emergence of the error signal from the register is stored in a memory for future reference. Should more than one error be present, the circuit remains in its "shift" mode, and the total counts associated respectively with these errors are stored sequentially in the memory. When no more errors are present in the register, the locations of the defective chips which have been stored in memory may then be read-out and the chips replaced. Subsequently, the circuit resumes its "look" mode.

It should be observed that while the invention has been described as being utilized with chips arranged in an island configuration, the circuit is modular and may be adapted to collect and process errors from a subsection of logic of any size.

Other features and advantages of the present invention will become apparent in the detailed description appearing hereinafter.

DESCRIPTION OF THE PREFERRED EMBODIMENT

Figure 1:
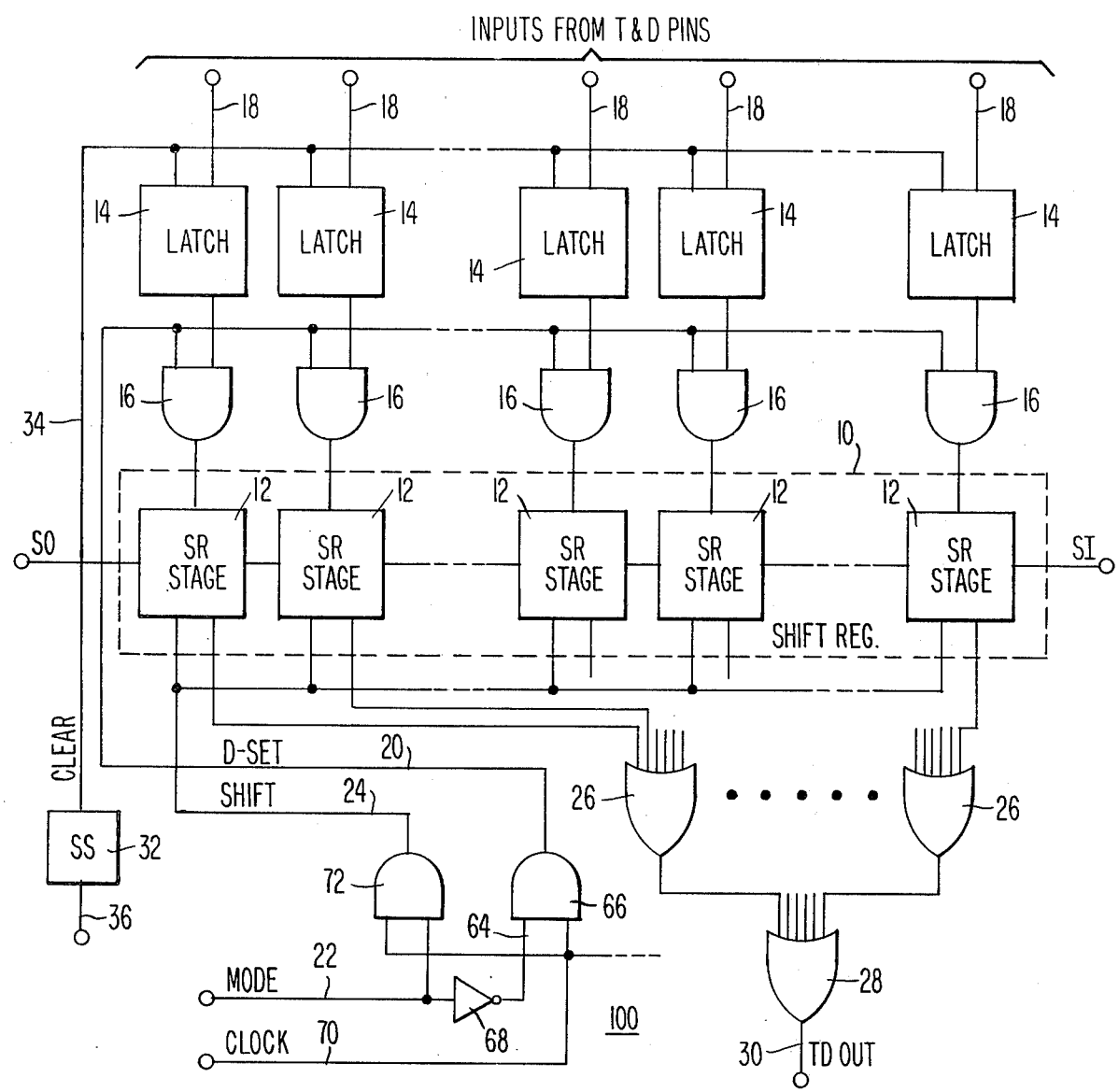
FIG. 1 is a logical diagram of the collection chip portion of the present invention illustrating particularly the shift register stages for receiving the error signals.

FIG. 1 depicts in logical form the collection portion of the present invention. In a practical embodiment, the modules represented in FIG. 1 may comprise a single integrated circuit chip 100.

A Shift Register 10 having a plurality of stages 12 is shown. Each of the stages is coupled to a fast acting latch 14 by an AND gate 16. Each latch is connected to the T&D pin of an integrated circuit chip in an operational logic subsection (not shown) by means of input lines 18. The latches are capable of being activated by even short duration pulses. Information in a latch 14 is transferred to the corresponding stage 12 of the shift register by a D-SET pulse applied on lines 20 to one input of AND gates 16, the other input to the gates being connected to the output of the latch 14. The D-SET pulse is derived from the MODE line 22, when the latter is in a first of its two states. The information stored in each shift register stage 12 is shifted from one stage to the adjacent stage by SHIFT pulses on lines 24, when the MODE line 22 is in its second state. The action of the MODE line 22 will be considered in detail in connection with FIG. 2.

The information stored in each of the shift register stages 12 is available as an output from the collection circuit of FIG. 1, by virtue of being OR'ed together in gates 26 and gate 28. A plurality of OR gates 26 are depicted and implied, each capable of receiving inputs from six shift register stages 12. It should be understood that while these gate inputs represent typical OR gate capabilities, a smaller group of OR gates each capable of accepting a larger number of inputs or a single large OR gate capable of receiving all of the shift register inputs could be utilized.

Figure 2:
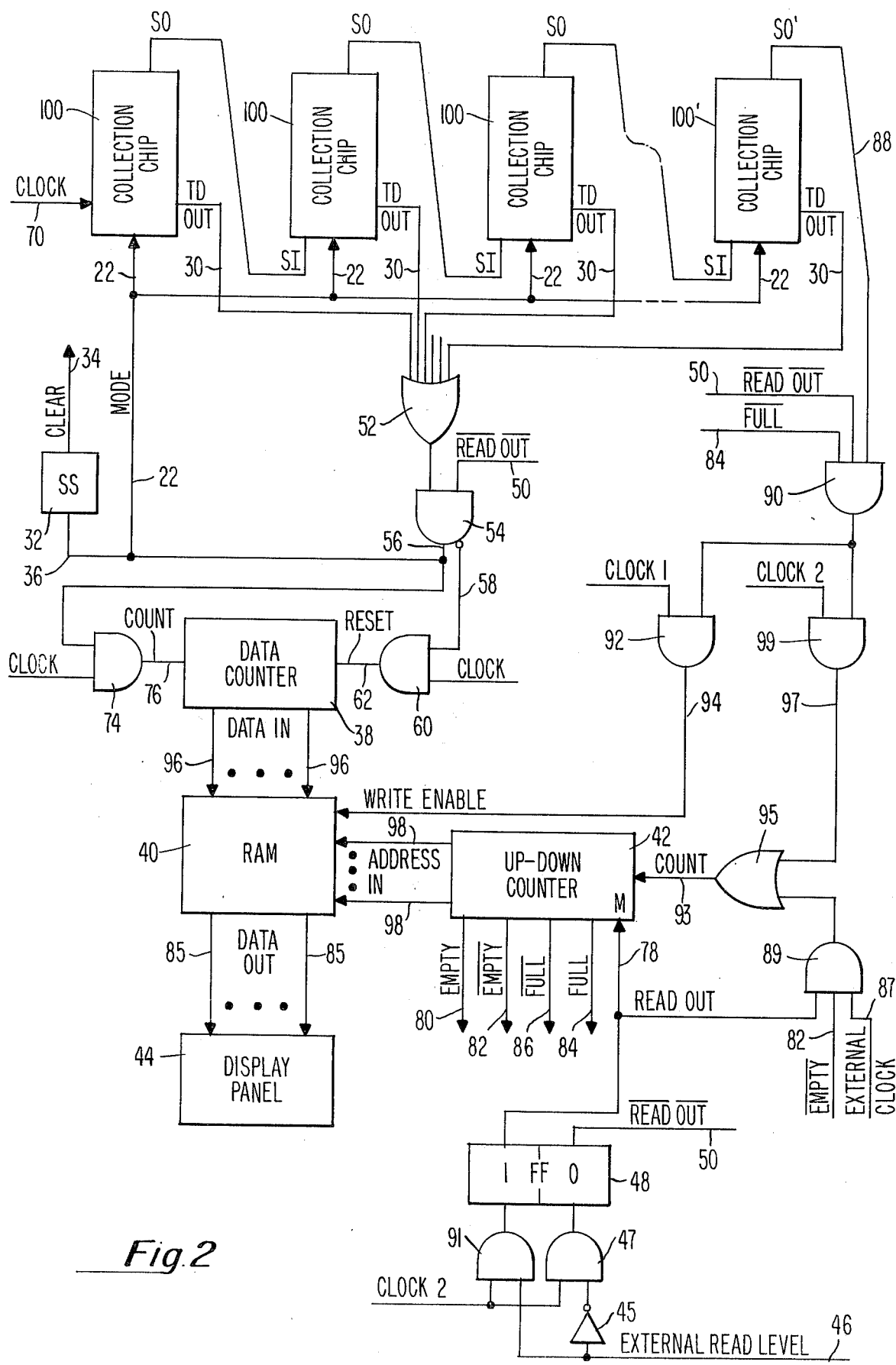
FIG. 2 is a logical diagram incorporating the collection chips of FIG. 1 and depicting the cooperative relationship of these chips with means for identifying and storing the locations from which the error signals originated.

In the practical IC chip configuration represented by FIG. 1, the outputs of OR gates 26 in turn provide inputs to OR gate 28, the output of which designated TD OUT on line 30 represents a collection circuit chip input to the circuit modules of FIG. 2.

Lines SI and SO respectively represent electrical connections into the input and output stages of the shift register 10, and are utilized as in FIG. 2, for connecting a plurality of such shift registers in series. Here again, the use of a plurality of registers is a practical expedient to accommodate a large number of IC chips in the operating system. Depending upon the actual number of the last mentioned chips, and the number of stages in the shift register employed, fewer or greater numbers of such registers will be required than those shown in FIG. 2. The line SO of each shift register is connected to line SI of the adjacent shift register, and information leaves the last stage of the former and enters the first stage of the latter as information is shifted serially in response to the SHIFT pulses on lines 24 applied simultaneously to all of the stages.

Finally, the latches 14 are capable of being cleared simultaneously by an asynchronous CLEAR pulse generated by a Single-Shot (SS) Multivibrator 32 and applied thereto on lines 34. The Single-Shot 32 is triggered on line 36 in accordance with conditions present in the circuit of FIG. 2.

FIG. 2 depicts in logical form the identify/storage portion of the present invention. A plurality of collection chips 100 of the type illustrated in FIG. 1 are indicated. The other major modules include a Data Counter 38, a Random Access Memory (RAM) 40, and an Up-Down Counter 42. The circuit of FIG. 2 interfaces with an operator controlled Display Panel 44. The operator inputs to the collection scheme are an EXTERNAL READ LEVEL and EXTERNAL CLOCK.

Figure 3:
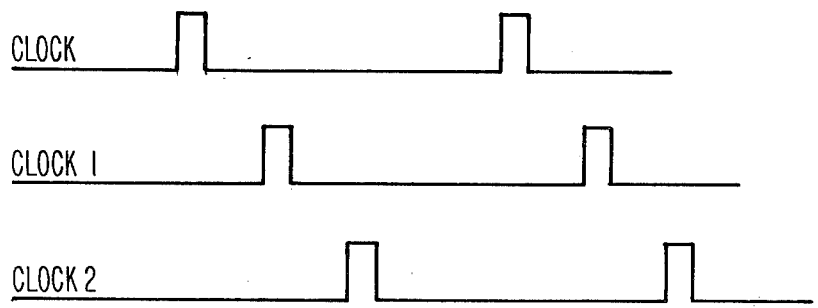
FIG. 3 is a timing diagram for the clock signals employed in the operation of FIGS. 1 and 2.

FIG. 3 indicates the times of occurence of three clock times designated respectively CLOCK, CLOCK 1, and CLOCK 2, relative to one another.

With continued specific reference to FIGS. 2 and 3 and general reference to FIG. 1, the operation of the present invention will be described. It will be assumed initially that the circuit means is in a "cleared" condition. Accordingly, the latches 14 and shift register stages 12 of the collection circuits 100 of FIG. 1 are clear. Counters 38 and 42 are set to "Zero", the RAM 40 is empty, and the EXTERNAL READ LEVEL input on line 46 is "low. By virtue of inverter 45, AND gate 47 is enabled at a CLOCK 2 time and Flip-Flop 48 is placed in the "0" state. This causes READ OUT level on line 50 derived therefrom to be "high". The absence of an error signal in each of the Shift Registers 10, causes the respective TD OUT's on lines 30 to be "low". The output of OR gate 52 is therefore "low". The two inputs to AND gate 54 at this time consist of the "low" output from OR gate 52 and the "high" from READ OUT line 50. Accordingly, the respective outputs from AND gate 54 are "low" on line 56 and "high" on line 58, the latter due to the negate function. Since line 58 is connected to one of the pair of inputs of AND gate 60, the occurence of CLOCK pulses on the other of its inputs, enables the gate and produces RESET pulses on line 62 which are applied to the Data Counter 38.

Since the other output line 56 of gate 54 is "low", the MODE line 22 is also "low". Reference to FIG. 1, reveals that if line 22 is "low", line 64, the input to AND gate 66, will be "high" due to inverter 68. Therefore, AND gate 66 will be enabled at CLOCK time by a pulse on line 70. This produces a common D-SET transfer pulse on all of lines 20, which in turn provide inputs to the AND gates 16. Thus, any information in the latches 14 will be transferred into the shift registers stages 12. The AND gate 72 associated with the second mode function involving application of the SHIFT pulses to the registers, will remain unenabled at the CLOCK time.

Also, with additional reference to FIG. 2, the "low" on output line 56 of AND gate 54, prevents the triggering of Single-Shot 32 via line 36. As noted hereinbefore, the function of the Single-Shot 32 is to clear all of the latches 14 by applying its output pulse to lines 34. It may be assumed that all of the latches 14 are already in a cleared condition as a result of the preceding cycle of operation.

Another effect of the "low" on output line 56 of AND gate 54 is that AND gate 74 whose output on line 76 is a COUNT pulse to the Data Counter 38 remains unenabled at the CLOCK time.

The Up-Down Counter 42 which may consist of a plurality of bistable elements, such as flip-flops, is also initially in a cleared condition. Whether the counter counts in an "up" or "down" mode is determined by the signal level on the READ OUT line 78 which is coupled to the "1" output of Flip-Flop 48 and to the "M" input of counter 42. Since as noted earlier, Flip-Flop 48 is in the "0" state in the absence of an EXTERNAL READ LEVEL, the READ OUT line 78 is "low" and this is assumed to place the counter 42 in the count "up" mode. It should also be mentioned that the counter provides indications of the status of the RAM 40, since the count in counter 42 is directly related to the storage capacity of the RAM. Thus, it is assumed initially that all of the counter 42 flip-flops are in the "0" state, that is, the counter 42 and the RAM 40 are clear. Line 80 shown exiting the counter and labeled EMPTY is also "high". Line 80 may in fact be the output line from an AND gate within the counter (not shown), the inputs of which are connected respectively to the "0" outputs of the flip-flops. Conversely, line 82, the $\overline{\text{EMPTY}}$ line may be derived from the former by "inverting" the output on the EMPTY line 82. Thus, if one or more of the flip-flop stages in counter 42 are in the "1" state, the $\overline{\text{EMPTY}}$ line would be "high".

Similarly, if a count representative of all "1's" in the counter corresponds to a full RAM, line 84 designated FULL, will be "high". This line may be the output from an AND gate (not shown) whose inputs are tied respectively to the "1" outputs of all of the flip-flops in the counter. Line 86, the $\overline{\text{FULL}}$ output is the "inversion" of the signal on the FULL line and will be "high", so long as there is storage capacity in the RAM, i.e., the counter has not attained a count of all "1's".

With the circuit initially in a "Cleared" condition, it is now assumed that the voltage levels on certain ones of the lines 18 connected to the T&D pins of the operational chips, indicate that errors are present or imminent therein. These error signals, whether transient or steady state, are collected in the corresponding latches 14. At the CLOCK time, as seen in FIG. 1, the signals are transferred via AND gates 16 into the associated shift register stages 12 thru the action of the D-SET signals applied by way of AND gate 72 to all of the latches 14. An output, or outputs, from these stages are coupled via OR gates 26 and 28 to one or more TD OUT lines 30. As seen in FIG. 2, the error signals are then coupled through OR gate 52 into one of the inputs to AND gate 54. Under these conditions, AND gate 54 is enabled, causing its output lines 58 and 56 to go "low" and "high" respectively. The former terminates the RESET pulse signals to the Data Counter 38 by disabling AND gate 60. The latter, as seen in FIG. 1, disables AND gate 66 terminating the D-SET signals, and enabling AND gate 72 which provides SHIFT pulses to all of the register stages by way of lines 24 at the CLOCK times. Simultaneously, AND gate 74 (FIG. 2) is enabled, and a count is begun of the SHIFT pulses being applied to the register stages 12. Also, the "high" on line 36 of the Single-Shot 32, triggers the device and causes a CLEAR output pulse on line 34 to be applied to all of the latches 14 simultaneously.

It will be assumed for purpose of explanation, that an error signal was initially received by a shift register stage 12 in collection chip 100', which stage is fifth from the output line connection SO' of the register. In other words, the fifth shift pulse applied to this last register causes this error signal to appear on the output line 88, which goes "high", and is applied as an input to AND gate 90. This last gate is thus enabled since its READ OUT and FULL inputs on lines 50 and 84 respectively are also "high".

The output of AND gate 90 is applied to AND gate 92 and at the CLOCK 1 time, immediately following the SHIFT pulse which read the error signal onto the SO' line 88, gate 92 is enabled and its output on line 94 provides a WRITE ENABLE pulse to the RAM 40. The Data Counter 38 count of "5" which appears as input information on lines 96 to the RAM, is now written into the first address of the RAM, which address is specified by the Up-Down Counter 42 as a result of its input to the RAM 40 on ADDRESS IN lines 98.

The output of AND gate 90 is also applied to AND gate 99. At the CLOCK 2 time, following the CLOCK 1 time as seen in FIG. 3, gate 99 is enabled, providing an output on line 97 which is coupled via OR gate 95 to provide a COUNT pulse on line 93 to the Up-Down Counter 42. This last COUNT pulse causes the counter to count "up" by "1", and by virtue of the ADDRESS IN lines 98 from the counter, steps the RAM to the next address to await the next count from Data Counter 38, the latter count being indicative of the next location of an error signal. For example, if initially there were two errors in the registers, the second appearing in the 125th stage from the last register stage in Collection Chip 100', the count into the Data Counter 38 continues until the appearance of this error signal on line SO' causes the count of "125" to be read into the RAM.

When the Shift Registers 10 are empty, i.e., there are no longer any error signals on the TD OUT lines 30, the circuit returns to a cleared condition — the Data Counter 38 is reset, and all of the collection circuits 100 and 100', return to the D-SET mode to "look" for more errors from the operational chips.

As soon as one error location is stored in the RAM, the EMPTY line 80 from the Up-Down Counter 42 goes "low" and the EMPTY line 82, "high". Errors from the operational chips may be stored in the RAM until its storage capacity is reached. When the RAM is full, the FULL line 84 goes "high", and this indicates that the RAM must be read out. The operator then provides an EXTERNAL READ LEVEL on line 46, which causes AND gate 91 to be enabled at a CLOCK 2 time, switching Flip-Flop 48 to the "1" state. The "1" output from the Flip-Flop 48 causes the READ OUT line 78 to go "high", putting the counter in a "count down" mode, and also causing an input to AND gate 89, to go "high". Since the EMPTY line 82 input to this last gate is also "high", the gate is enabled by the application of an EXTERNAL CLOCK on line 87 thereto by the operator. The output of AND gate 89 passes through OR gate 95 which applies COUNT pulses to the Up-Down Counter at the EXTERNAL CLOCK time. Each of the addresses in the RAM are interrogated via the ADDRESS IN lines 98 to obtain the counts which are directly related to the chip locations at which the errors occurred. The output of the RAM appears on lines 85, which provide inputs to an indicating device 44, such as a visual display comprised of light emitting diodes. The read out operation then continues until the Up-Down Counter is counted down to all "0's", at which time the EMPTY line 82 goes "low", disabling gate 89. During the read out operation, AND gates 54 and 90 were disabled, by the "low" READ OUT. Removal of the EXTERNAL READ LEVEL by the operator, causes the READ OUT lines 50 to go "high", thereby permitting the circuits of the present invention to initiate a new collection/processing cycle.

From the foregoing description, it is readily apparent that the circuit means of the present invention provides a convenient and reliable tool for isolating errors which occur in operational integrated circuits. It should be understood that changes and modifications of the circuit organization presented herein may be needed to suit particular requirements. Such changes and modifications are well within the skill of the electronics circuit designer, and insofar as they are not departures from the true scope and spirit of the invention, are intended to be covered by the following claims.

What is claimed is:

1. Circuit means for collecting, identifying and storing error signals appearing on the respective test and diagnostic (T&D) terminals of a plurality of integrated circuit (IC) chips during the operation thereof, said circuit means comprising:

shift register means having a plurality of shift register stages, each of said stages being coupled to one of said T&D terminals, said shift register means being initially in a first non-shifting mode for collecting error signals from said IC chips, first gating means coupled to said shift register means and being responsive to the storage of at least one of said error signals by said shift register stages for causing said shift register means to assume a second shifting mode and for providing SHIFT pulses in common to all of said shift register stages, said error signal being shifted serially from one stage to the next in response to said SHIFT pulses and ultimately exiting the last stage in said shift register means, data counter means coupled to said first gating means for maintaining a count of the number of SHIFT pulses required to cause said error signal to exit said last stage of said shift register means, memory means operatively coupled to said data counter means and being capable of storing the count contained therein, second gating means coupled to both said last stage of said shift register means and to said memory means and being responsive to the emergence of said error signal from said last register stage for enabling the writing of the count then present in said data counter means an said memory means, said last mentioned count being directly related to the location of the IC chip on whose T&D terminal the error signal originated.

2. Circuit means as defined in claim 1 further characterized in that said shift register means includes OR gate means for ORing together the information stored in said plurality of stages.

3. Circuit means as defined in claim 2 further characterized in that said first gating means includes a first AND gate having one of its inputs coupled to the output of said OR gate means and one of its pair of outputs connected to the input of a mode circuit, said mode circuit including a pair of AND gates for receiving respectively the output and inverted output of said first AND gate on one of a pair of input terminals and a CLOCK pulse on the other of said input terminals, said last mentioned AND gates providing respectively D-SET pulse and SHIFT pulse outputs selectively as determined by signal levels applied to the input of said mode circuit.

4. Circuit means as defined in claim 3 wherein said data counter means is coupled to said first gating means by count gating means, said one of the pair of outputs of said first AND gates providing a signal input to said count gating means in the presence of an error signal in said shift register means, said count gating means having its output coupled to said data counter, said last mentioned gating means being enabled at CLOCK times to apply COUNT pulses to said data counter means in coincidence with said SHIFT pulses.

5. Circuit means as defined in claim 4 further characterized in that the other of said pair of outputs of said first AND gate provides a negated signal input to reset gating means having its output coupled to said data counter means, said last mentioned gating means being enabled at CLOCK times to apply RESET pulses to said data counter means in the absence of error signals in said shift register means.

6. Circuit means as defined in claim 5 further including a plurality of latches each having an input terminal connected to one of said T&D terminals, a plurality of AND gates associated respectively with said latches, the output of each of said latches being applied to one of a pair of inputs of its associated AND gate and the outputs of said AND gates being applied respectively to the inputs of said shift register stages, means for applying said D-SET pulse in common to the other of said AND gate inputs, an error signal present in a given one of said latches being transferred to its associated shift register stage in response to said D-SET pulse.

7. Circuit means as defined in claim 6 further including means coupled to said memory means for stepping the latter to the next address in preparation for the storage therein of the next count representing an error signal location.

8. Circuit means as defined in claim 7 further characterized in that said means for stepping said memory means to the next sequential address is an up-down counter, third gating means responsive to the emergence of said error signal from the last stage of said shift register means for applying a COUNT pulse to said up-down counter to change the count therein in a predetermined direction, said last mentioned COUNT pulse occurring after each writing of count information from said data counter means into said memory means, the count within said up-down counter providing an address input to said memory means.

9. Circuit means as defined in claim 8 further characterized in that said up-down counter provides an indication of the state of said memory means based upon its internal count and the corresponding voltage levels appearing respectively on its FULL, $\overline{\text{FULL}}$, EMPTY, and $\overline{\text{EMPTY}}$ lines.

10. Circuit means as defined in claim 9 further including means for reading out the count information stored in said memory means, the read-out means comprising a flip-flop, fourth gating means for receiving respectively an EXTERNAL READ LEVEL signal and its inverse, said flip-flop having a first of its sides coupled to said up-down counter, the output level on said first flip-flop determining the direction of the count in said last mentioned counter, the presence of said EXTERNAL READ LEVEL signal causing said up-down counter to be conditioned for counting in a direction opposite to that employed for loading said memory means, and additional gating means for causing count pulses to be applied to said up-down counter at an EXTERNAL CLOCK rate.

11. Circuit means as defined in claim 10 further characterized in that the second side of said flip-flop is coupled to the other of said pair of inputs of said first AND gate, the absence of said EXTERNAL READ LEVEL signal causing the output level on said second flip-flop side to act in conjunction with an error signal on the other input to said first AND gate to enable said last mentioned gate.

12. Circuit means as defined in claim 11 further including a single-shot multivibrator having its output coupled in common to all of said latches, means responsive to the presence of an error signal in said shift register means for applying a trigger pulse to the input of said single-shot, the output of said single-shot clearing said latches.

13. Circuit means as defined in claim 12 further including means for displaying the count information read-out of said memory means.

14. Circuit means as defined in claim 13 further characterized in that said memory means is a random access memory.

15. Circuit means as defined in claim 1 further characterized in that said shift register means comprises a plurality of shift registers in series relationship, each register having a plurality of stages, the last stage of a given register being connected to the first stage of the next register, the information contained in all of the stages of each register being ORed together to produce a single shift register output, the respective shift register outputs of said plurality of shift registers being in turn ORed together to produce a single ORed output which serves as an input to said first gating means.

* * * * *